United States Patent
Niederhofer

(10) Patent No.: US 9,969,437 B1
(45) Date of Patent: May 15, 2018

(54) VEHICLE FLOOR SECTION

(71) Applicant: Bill Niederhofer, Tyler, TX (US)

(72) Inventor: Bill Niederhofer, Tyler, TX (US)

( * ) Notice: Subject to any disclaimer, the term of this patent is extended or adjusted under 35 U.S.C. 154(b) by 0 days. days.

(21) Appl. No.: 15/354,813

(22) Filed: Nov. 17, 2016

(51) Int. Cl.
  *B62D 25/20* (2006.01)
  *A61G 3/06* (2006.01)

(52) U.S. Cl.
  CPC .............. *B62D 25/20* (2013.01); *A61G 3/062* (2013.01); *A61G 3/066* (2013.01)

(58) Field of Classification Search
  CPC ........................... B62D 25/20; B62D 25/2027; B62D 25/2036; B62D 25/2009; B62D 21/02; B62D 25/087; B62D 25/2018; B32B 2262/101; B32B 27/065; B32B 27/32; B32B 7/12; B32B 27/20; B32B 21/08; B32B 21/14; B32B 2262/106
  USPC .... 296/193.07, 187.08, 204, 193.08, 29, 75, 296/1.08
  See application file for complete search history.

(56) References Cited

U.S. PATENT DOCUMENTS

| | | | | |
|---|---|---|---|---|
| 3,604,022 A | * | 9/1971 | Smith | B60N 2/36 5/118 |
| 4,246,982 A | * | 1/1981 | Pretnick | F16N 31/004 180/69.1 |
| 7,316,834 B2 | * | 1/2008 | Hernandez | E04H 6/428 180/69.1 |
| 8,936,301 B2 | * | 1/2015 | Thota | B60N 2/206 296/193.07 |
| 2003/0057724 A1 | * | 3/2003 | Inagaki | B60N 2/3013 296/37.8 |
| 2016/0152170 A1 | * | 6/2016 | Kiyak | A61G 3/061 414/522 |
| 2016/0242975 A1 | * | 8/2016 | Kitchin | A61G 3/066 |

* cited by examiner

*Primary Examiner* — D Glenn Dayoan
*Assistant Examiner* — Sunsurraye Westbrook

(57) ABSTRACT

A replaceable floor to cooperate with a handicap entrance may include a bottom wall for the replaceable floor; a front section; a middle section connected to the front section; and a back section connected to the middle section. The front section may include a front wall connected to the bottom wall; and a pair of opposing side walls may be connected to the bottom wall. One of the opposing side walls may include a common sidewall to the first section and the middle section.

6 Claims, 5 Drawing Sheets

VEHICLE FLOOR SECTION

FIELD OF THE INVENTION

The present invention relates to a vehicle floor section and more particularly to a vehicle floor section that cooperates with a lift device for a handicapped individual.

BACKGROUND

One of the major disadvantages of handicapped individuals is the restrictions on mobility. The handicapped individuals need a lift mechanism for use in a vehicle in order to raise and lower the individual and wheelchair to allow access to a vehicle. Few vehicles are able to accommodate the lift mechanism when purchased from the vehicle manufacturer. This requires that the vehicles be modified to accommodate the lift mechanism. In many cases, the floor of the vehicle has to be modified in order to accommodate the lift mechanism and the wheelchair within the vehicle. Furthermore, the seats in the vehicle have to be rearranged in order to accommodate the above-mentioned considerations.

SUMMARY

A replaceable floor which may be for a Ram Pro Master to cooperate with a handicap entrance may include a bottom wall for the replaceable floor; a front section; a middle section connected to the front section; and a back section connected to the middle section.

The front section may include a front wall connected to the bottom wall; and a pair of opposing side walls may be connected to the bottom wall. One of the opposing side walls may include a common sidewall to the first section and the middle section.

The first section may include a front edge to cooperate with a lift for the handicap entrance.

The back section may include a back wall.

The first section may include being connected to the middle section by a first connecting wall.

The middle section may be connected to the by a third connecting wall.

The middle section may be connected to the by a second connecting wall.

BRIEF DESCRIPTION OF THE DRAWINGS

The invention may be understood by reference to the following description taken in conjunction with the accompanying drawings, in which, like reference numerals identify like elements, and in which.

DETAILED DESCRIPTION

Figure 1:
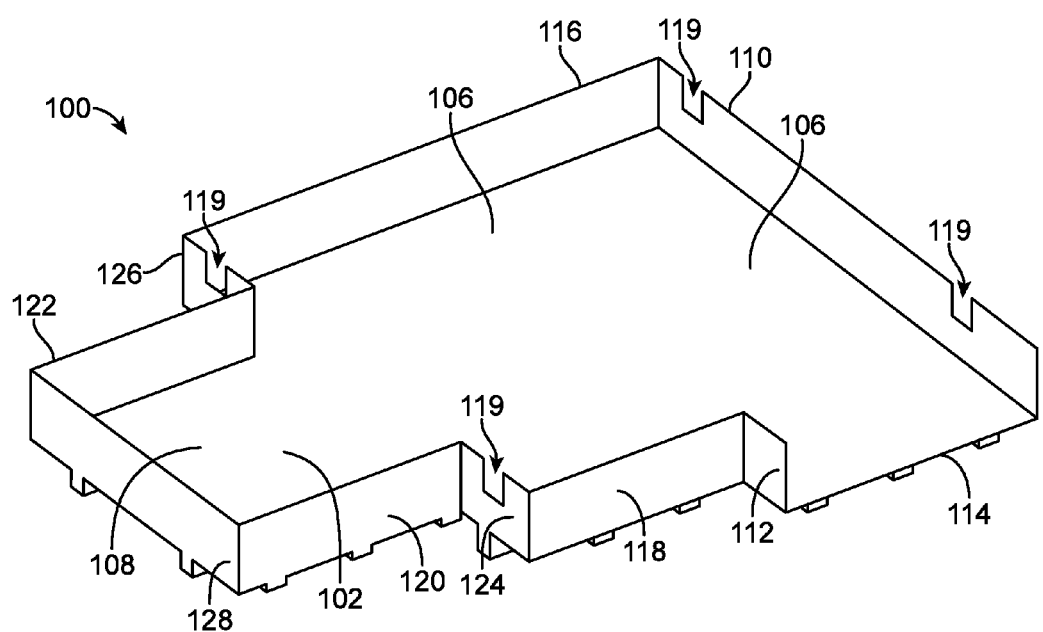
FIG. 1 illustrates a perspective view of the floor section of the present invention.

FIG. 1 illustrates a perspective view of the floor section 100 which may be for a Ram Pro Master vehicle of the present invention and illustrates the bottom wall 102 which may support the entire floor section 100 of the present invention. The bottom wall 102 may include three sections, a front bottom wall section 104, a middle bottom wall section 106 and a back bottom wall section 108. Each of the front bottom wall section 104, the middle bottom wall section 106 and the back bottom wall section 108 may be substantially rectangular, and the front bottom wall section 104 may be connected to the middle bottom wall section 106 which may be connected to the back bottom wall section 108. The front bottom wall section 104 may be connected to an upward extending front wall 110 and may be connected to an upward extending first connecting wall 112. The front bottom wall section 104 may include a front edge 114 which may cooperate with a door of the vehicle (not shown) and/or a lift mechanism (not shown), and may include a upward extending common first side wall 116 which may connect with the front bottom wall section 104, the middle bottom wall section 106 and the front wall 110. The front wall 110 may include a pair of opposing notches 119.

The middle bottom wall section 106 may include a upward extending second sidewall 118 which may be connected to the bottom wall 102 and may include the upward extending common first sidewall 116 which may be connected to the bottom wall 102.

The bottom wall back section 108 may include an upward extending third sidewall 120 and an upward extending fourth sidewall 122. The third sidewall 120 may be connected to the bottom wall 102 and the fourth sidewall 122 may be connected to the bottom wall 102.

The second sidewall 118 may be connected to an upward extending connecting second sidewall 124 which may be connected to the bottom wall 102 and which may be connected to the third sidewall 120.

The common first sidewall 116 may be connected to an upward extending connecting third sidewall 126 which may be connected to the fourth sidewall 122.

The second sidewall 124 and the third sidewall 126 may include notches 119.

The back bottom wall section 108 may include the third sidewall 120, the fourth sidewall 122 and the back wall 128 which may be connected to the bottom wall 120, the third sidewall 120 and the fourth sidewall 122.

Figure 4:
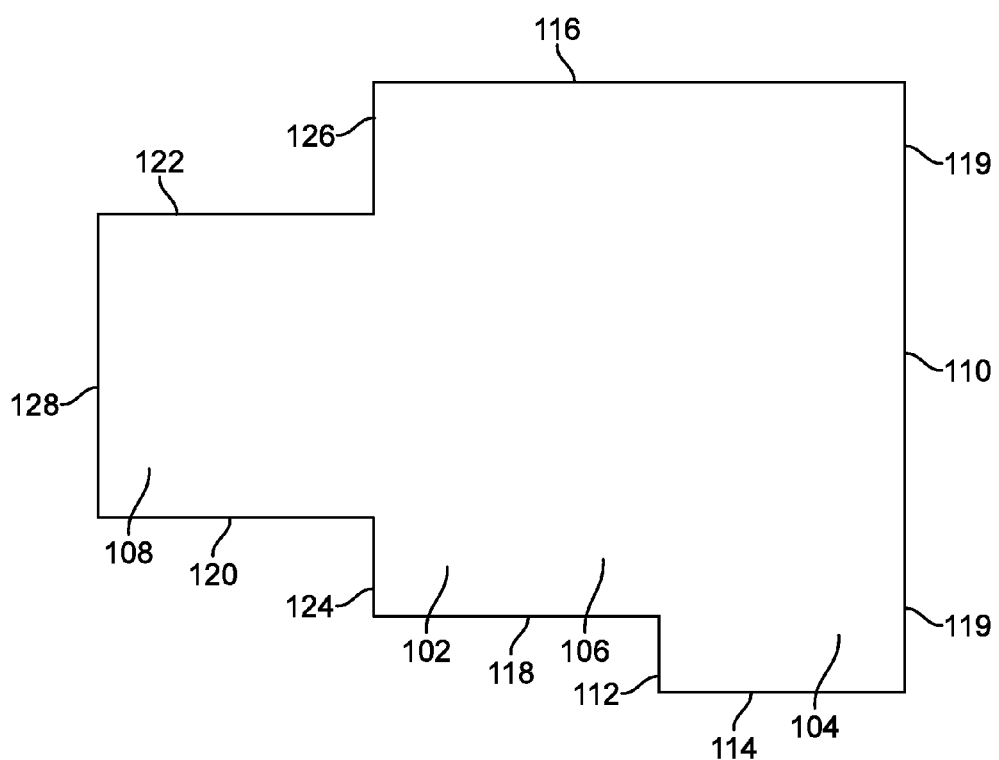
FIG. 4 illustrates a top view of the floor section of the present invention.

FIG. 4 illustrates a top view of the floor section 100 which may be for a Ram Pro Master vehicle of the present invention and illustrates the bottom wall 102 which may support the entire floor section 100 of the present invention. The bottom wall 102 may include three sections, a front bottom wall section 104, a middle bottom wall section 106 and a back bottom wall section 108. Each of the front bottom wall section 104, the middle bottom wall section 106 and the back bottom wall section 108 may be substantially rectangular, and the front bottom wall section 104 may be connected to the middle bottom wall section 106 which may be connected to the back bottom wall section 108. The front bottom wall section 104 may be connected to an upward extending front wall 110 and may be connected to an upward extending first connecting wall 112. The front bottom wall section 104 may include a front edge 114 which may cooperate with a door of the vehicle (not shown) and/or a lift mechanism (not shown), and may include a upward extending common first side wall 116 which may connect with the front bottom wall section 104, the middle bottom wall section 106 and the front wall 110. The front wall 110 may include a pair of opposing notches 119.

The middle bottom wall section 106 may include a upward extending second sidewall 118 which may be connected to the bottom wall 102 and may include the upward extending common first sidewall 116 which may be connected to the bottom wall 102.

The bottom wall back section 108 may include an upward extending third sidewall 120 and an upward extending fourth sidewall 122. The third sidewall 120 may be connected to the bottom wall 102 and the fourth sidewall 122 may be connected to the bottom wall 102.

The second sidewall 118 may be connected to an upward extending connecting second sidewall 124 which may be connected to the bottom wall 102 and which may be connected to the third sidewall 120.

The common first sidewall 116 may be connected to an upward extending connecting third sidewall 126 which may be connected to the fourth sidewall 122.

The second sidewall 124 and the third sidewall 126 may include notches 119.

The back bottom wall section 108 may include the third sidewall 120, the fourth sidewall 122 and the back wall 128 which may be connected to the bottom wall 120, the third sidewall 120 and the fourth sidewall 122.

Figure 5:
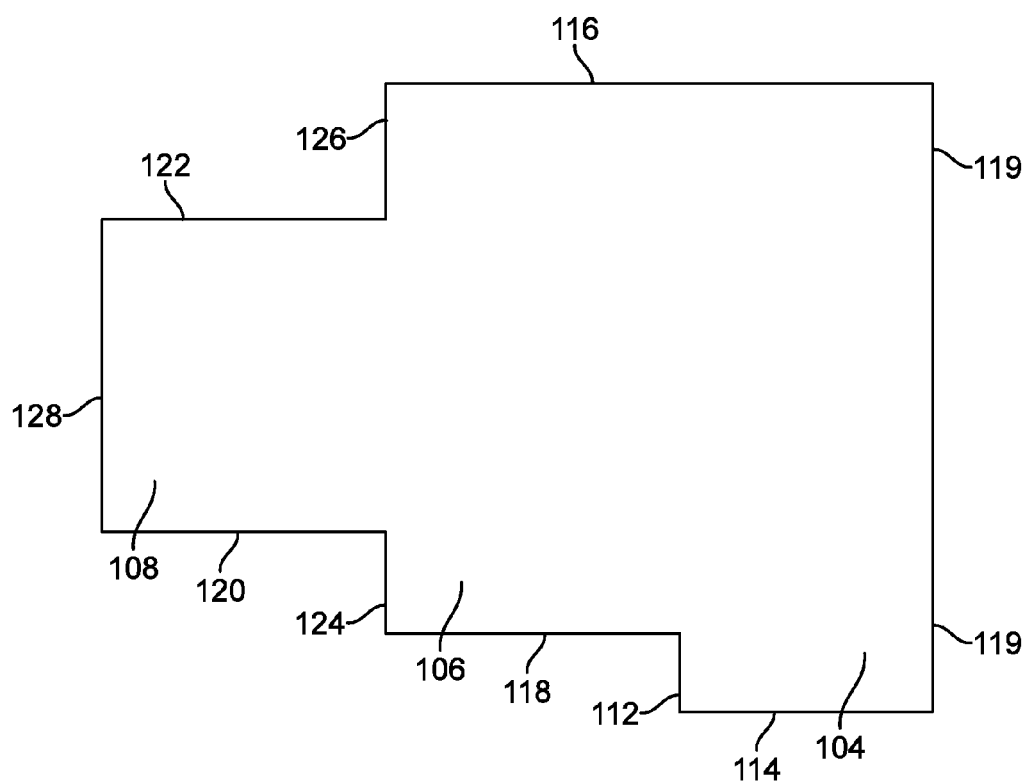
FIG. 5 illustrates a bottom view of the floor section of the present invention.

FIG. 5 illustrates a bottom view of the floor section 100 which may be for a Ram Pro Master vehicle of the present invention and illustrates the bottom wall 102 which may support the entire floor section 100 of the present invention. The bottom wall 102 may include three sections, a front bottom wall section 104, a middle bottom wall section 106 and a back bottom wall section 108. Each of the front bottom wall section 104, the middle bottom wall section 106 and the back bottom wall section 108 may be substantially rectangular, and the front bottom wall section 104 may be connected to the middle bottom wall section 106 which may be connected to the back bottom wall section 108. The front bottom wall section 104 may be connected to an upward extending front wall 110 and may be connected to an upward extending first connecting wall 112. The front bottom wall section 104 may include a front edge 114 which may cooperate with a door of the vehicle (not shown) and/or a lift mechanism (not shown), and may include a upward extending common first side wall 116 which may connect with the front bottom wall section 104, the middle bottom wall section 106 and the front wall 110. The front wall 110 may include a pair of opposing notches 119.

The middle bottom wall section 106 may include a upward extending second sidewall 118 which may be connected to the bottom wall 102 and may include the upward extending common first sidewall 116 which may be connected to the bottom wall 102.

The bottom wall back section 108 may include an upward extending third sidewall 120 and an upward extending fourth sidewall 122. The third sidewall 120 may be connected to the bottom wall 102 and the fourth sidewall 122 may be connected to the bottom wall 102.

The second sidewall 118 may be connected to an upward extending connecting second sidewall 124 which may be connected to the bottom wall 102 and which may be connected to the third sidewall 120.

The common first sidewall 116 may be connected to an upward extending connecting third sidewall 126 which may be connected to the fourth sidewall 122.

The second sidewall 124 and the third sidewall 126 may include notches 119.

The back bottom wall section 108 may include the third sidewall 120, the fourth sidewall 122 and the back wall 128 which may be connected to the bottom wall 120, the third sidewall 120 and the fourth sidewall 122.

Figure 2:
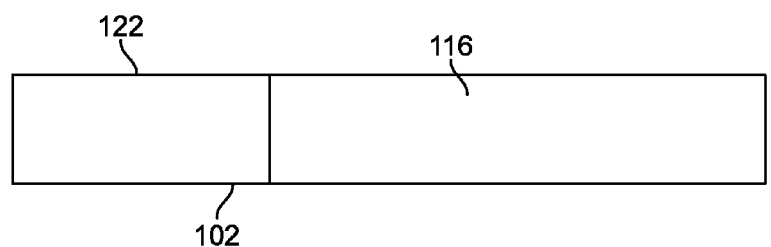
FIG. 2 illustrates a first side view of the floor section of the present invention.

FIG. 2 illustrates a first side view of the floor section of the present invention and illustrates the bottom wall 102, the common fund sidewall 106 and the fourth sidewall 122.

Figure 3:
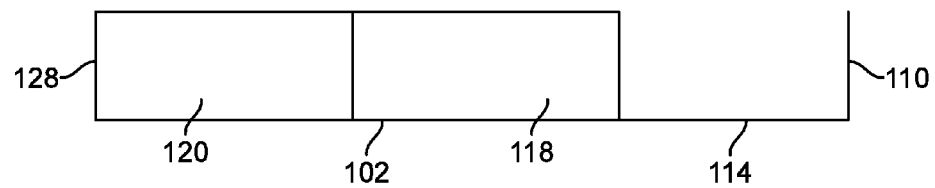
FIG. 3 illustrates a second side view of the floor section of the present invention.

FIG. 3 illustrates a second side view of the floor section of the present invention and illustrates the bottom wall 102, the front page 114, the second sidewall below 118 and the third sidewall 120.

Figure 6:
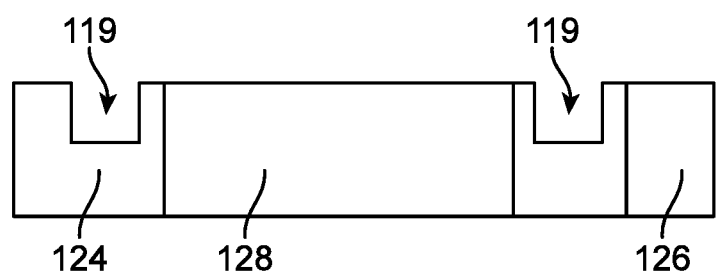
FIG. 6 illustrates a first end view of the floor section of the present invention.
Figure 7:
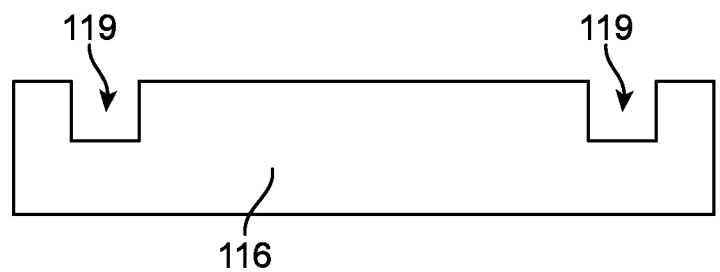
FIG. 7 illustrates a second end view of the floor section of the present invention.

FIG. 6 illustrates a first end view of the floor section of the present invention and illustrates the back wall 128, the connecting second sidewall 124, the connecting third sidewall 126 and the notches 119. FIG. 7 illustrates a second end view of the floor section of the present invention and illustrates the front wall 110 and the notches 119.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed.

The invention claimed is:

1. A replaceable floor to cooperate with a handicap entrance, comprising:
   a bottom wall for the replaceable floor that includes three connected but separately defined substantially rectangular sections: a front section, a middle section and a back section;
   the front section may include a front wall;
   the middle section connected to the front section may include three connecting walls and upward extending sidewalls;
   the back section connected to the middle section may include a back wall;
   wherein the front section includes a front wall containing notches connected to the bottom wall;
   wherein a pair of opposing side walls are connected to the bottom wall;
   wherein one of the opposing side walls includes a common sidewall to the first section and the middle section.

2. A replaceable floor to cooperate with a handicap entrance as in claim 1, wherein the front section includes a front edge to cooperate with a ramp for the handicap entrance.

3. A replaceable floor to cooperate with a handicap entrance as in claim 1, wherein the back section includes a back wall that contain notches and is connected to a second and third sidewall.

4. A replaceable floor to cooperate with a handicap entrance as in claim 1, wherein the front section is connected to the middle section by a first connecting wall.

5. A replaceable floor to cooperate with a handicap entrance as in claim 1, wherein the middle section is connected to the by a third connecting wall.

6. A replaceable floor to cooperate with a handicap entrance as in claim 1, wherein the middle section is connected to the by a second connecting wall.

\* \* \* \* \*